March 13, 1928.
D. W. MYERS ET AL
VALVE FOR MILKING MACHINES
Filed Jan. 5, 1925
1,662,617
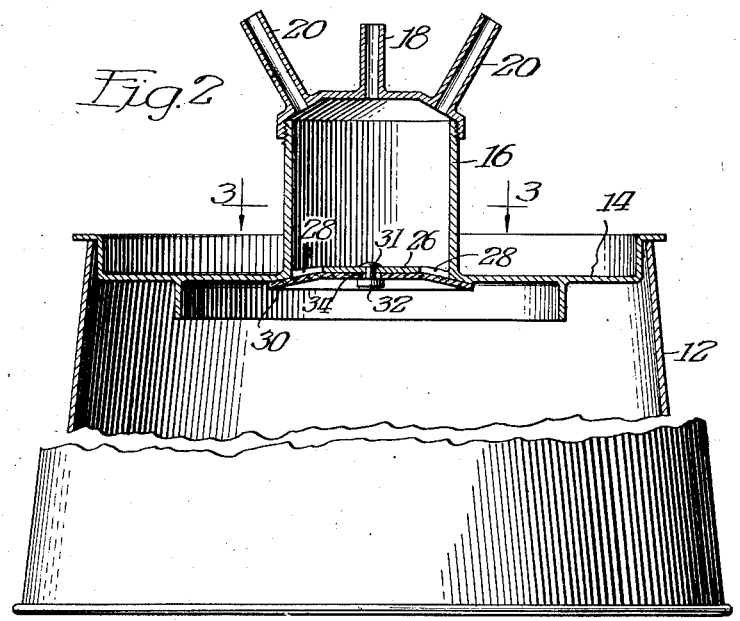
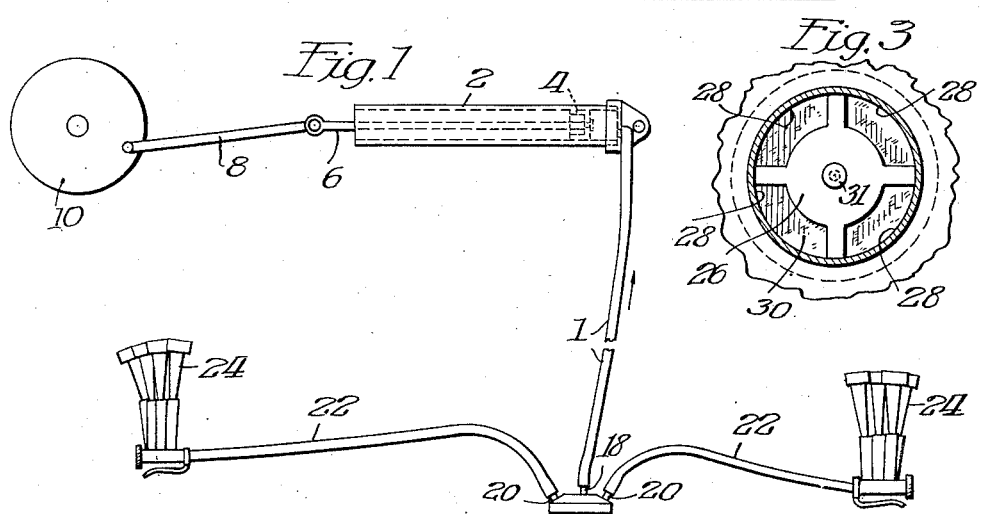
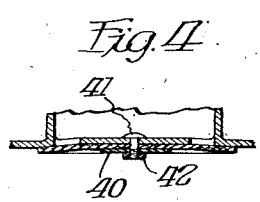
Inventors:
David W. Myers and
Ralph L. Sherman,
By Cheever & Cox
Attys Patented Mar. 13, 1928.

1,662,617

UNITED STATES PATENT OFFICE.

DAVID W. MYERS, OF WINNETKA, AND RALPH L. SHERMAN, OF OAK PARK, ILLINOIS.

VALVE FOR MILKING MACHINES.

Application filed January 5, 1925. Serial No. 481.

Our invention relates to valves for milking machines, and the object is to provide a machine of extremely simple construction and one composed of parts which may be readily renewed. The machine relates primarily to a milker of that type in which the milk from the teat cups flows to the milk pail through a tube which is under vacuum intermittently, thus making it possible to employ a single tube for conveying the milk to the pail and for providing the air which causes the teat cup to deflate or collapse to produce the squeezing action upon the teat. Our machine includes a valve chamber which is intermittently under vacuum and a valve which permits the milk to flow from this chamber into the milk pail while preventing the flow of air in the reverse direction. It is this valve chamber and valve which constitute the vitalizing features of the invention.

We accomplish our object by the mechanism illustrated in the drawings, in which

Figure 1 is a general view of the apparatus.

Figure 2 is a side elevation of the milk pail and vacuum chamber and associated parts, the view being partly in central vertical section.

Figure 3 is a plan section on the line 3—3 Figure 2.

Figure 4 is a sectional detail showing a modified form of valve.

Like numerals denote like parts throughout the several views.

Referring to the form shown in Figures 1 to 3 of the drawings, a suction tube 1 is put under vacuum intermittently by means of a suitable air pump here shown more or less diagrammatically and consisting of a cylinder 2 having a plunger 4 which is reciprocated by a plunger stem 6 joined to a connecting rod 8 operated by an eccentric 10. It will be understood that any appropriate means may be substituted for intermittently producing a partial vacuum in said suction tube.

The milk pail 12 has a cover 14 which is surmounted by a valve chamber 16 provided at the top with a central nipple 18 and two branch nipples 20. The central nipple is for connection to the suction tube 1 while the branch nipples are for connection to the tubes 22, which connect with the teat cups 24. The valve chamber has a floor 26 which by preference is slightly arched as shown in Figure 2. It has ports 28 formed in it for the downward passage of milk and these ports are preferably arranged circumferentially as illustrated in Figure 3. A valve 30 is fastened to the under side of the floor at the center thereof and consists preferably of a rubber disc having a diameter somewhat larger than the diameter of the valve chamber. The disc is thick enough normally to hold it in close contact with the under side of the floor, thus keeping the ports tightly closed. The closeness of contact is assisted by the concavity of the floor and the fact that the disc is held closely to the bottom of the floor at the center.

While different forms of fastening devices for the valve may be employed, we have devised a simple and advantageous one which consists of a pin 31 projecting downward from the center of the floor and having an annular flange or shoulder 32 at the bottom. This is spaced from the bottom of the floor about the thickness of the disc and an aperture 34 is formed in the disc slightly smaller than the diameter of the head 32. Consequently by stretching the rubber somewhat the valve may be slipped over the head of the pin after which it will hold itself in position.

In operation, as vacuum is intermittently created in suction pipe 1 the valve chamber 16 is intermittently put under vacuum and milk is drawn from the teat cup down through the milk tubes 22 and nipples 20 into the valve chamber. The vacuum in the valve chamber supplemented by the stiffness of the valve keeps the latter closed, but as milk begins to collect in the valve chamber its weight tends to open the valve. In practice the valve opens at a time when the valve chamber is not under vacuum and hence the opening of the valve to release the milk from the valve chamber will not break the vacuum in the valve chamber. Thus the valve will not open of its own weight but on the contrary tends to keep itself closed, and it is not until the vacuum is reduced in the valve chamber and milk has collected there that the valve will open. Consequently we have a valve which is mounted on the under side of the valve chamber and will pass the milk intermittently.

In Figure 4 we have shown a modification in which the stiffness of the valve is supplemented by a light metal spring disc 40. In this case the parts may be fastened together by a pin 41 which is threaded at the lower end to take a nut 42. The simpler form previously described is, however, preferable.

From the foregoing it will be evident that in the simplified form shown in Figures 1 to 3 the parts are few in number, inexpensive to make and efficient in action. Furthermore the valve, which is the only removable part, may be taken off or applied without the aid of any tool.

Having thus described our invention what we claim as new and desire to secure by Letters Patent is:

1. A valve chamber having a floor concave on the under side, the floor having a port for the downward passage of fluid, a shouldered pin at the center of the floor on the under side, and a rubber valve disc having an aperture at the center slightly less than the diameter of the shoulder on the pin whereby the disc may be secured to the pin in contact with the under surface of the floor by stretching the aperture in the disc sufficiently to enable it to pass over the shoulder.

2. A valve chamber having a floor concave on the underside, the floor having a port for the downward passage of fluid, a downwardly extending pin formed in the floor, the lower end of the pin being larger than its upper portions, and a rubber valve disc having an aperture of slightly smaller dimension than the lower end of the pin whereby the disc may be secured to the pin below the floor by stretching the aperture of the disc sufficiently to enable it to pass over the lower end of the pin.

In witness whereof we have hereunto subscribed our names.

DAVID W. MYERS.
RALPH L. SHERMAN.